J. H. FREY & M. MAYER.
BORING TOOL HOLDER.
APPLICATION FILED MAY 22, 1917.

1,256,462.

Patented Feb. 12, 1918.

WITNESSES
F. E. Gibson
R. M. Smith

INVENTOR
John H. Frey and
Matthew Mayer
BY Victor J. Evans
ATTORNEY

UNITED STATES PATENT OFFICE.

JOHN H. FREY AND MATTHEW MAYER, OF ERIE, PENNSYLVANIA.

BORING-TOOL HOLDER.

1,256,462.   Specification of Letters Patent.   Patented Feb. 12, 1918.

Application filed May 22, 1917.   Serial No. 170,329.

*To all whom it may concern:*

Be it known that we, JOHN H. FREY and MATTHEW MAYER, citizen of the United States of America and subject of the Emperor of Germany, respectively, residing at Erie, in the county of Erie and State of Pennsylvania, have invented new and useful Improvements in Boring-Tool Holders, of which the following is a specification.

This invention relates to boring tool holders, the object in view being to produce a holder of the class described embodying a novel construction and relative arrangement of parts which provide for an accurate adjustment of the tool carrying element in relation to that element which is connected to and driven by the live spindle of the machine in connection with which the holder is used, enabling the center of the tool to be offset to any desired extent from the center of the live spindle, the tool holder as a whole embodying means for taking up wear between the relatively movable parts and means for accurately guiding said parts in the relative movement thereof.

With the above and other objects in view, the invention consists in the novel construction, combination and arrangement of parts, herein described, illustrated and claimed.

In the accompanying drawings:—

Figure 1:
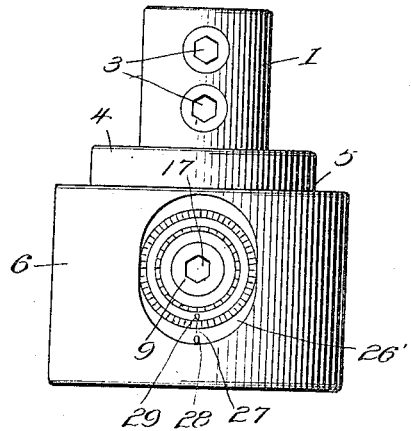
Figure 1 is a side elevation of a boring tool holder embodying the present invention.
Figure 2:
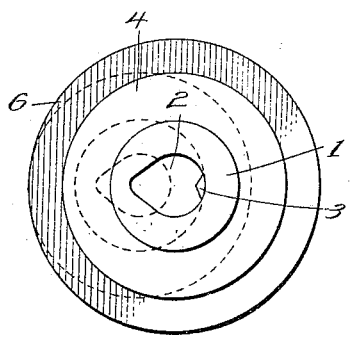
Fig. 2 is a top plan view of the same.

The tool holder contemplated in this invention comprises a sleeve 1 which is formed with a non-circular bore or socket 2 to receive round, square or hexagon tools secured in the bore 2 by means of one or more headless set screws 3 threaded through the side wall of the sleeve 1.

The sleeve 1 is formed with a cross head flange 4 the underside of which provides an annular abutment shoulder or bearing face 5 against which bears the adjacent meeting face of a body 6 of the holder. The sleeve 1, beyond the enlargement or flange 4 is reduced to form a neck 7 which extends well within the body 6 and terminates in an internally threaded cross head 8 which is internally threaded to receive and be engaged by a micrometer screw 9, the outer face of the head 8 forming a boring guiding surface for a tool holding member 10 shown as having an internally threaded socket 11 in which the end of the live spindle is received.

Figure 3:
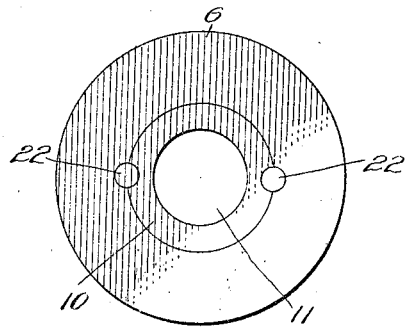
Fig. 3 is a bottom plan view thereof.
Figure 4:
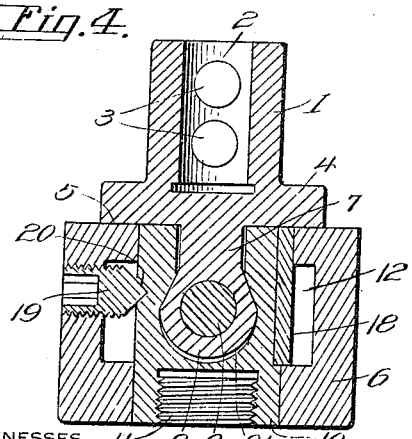
Fig. 4 is a diametrical section through the tool holder.
Figure 5:
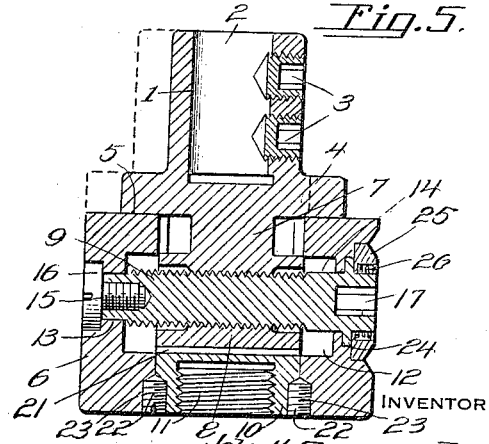
Fig. 5 is a diametrical section through the same taken at a right angle to Fig. 4.

The head 6 is chambered out as shown at 12 and formed in opposite sides thereof with bearing openings 13 and 14 for the smooth end portions of the micrometer screw 9 as shown in Fig. 4. One end of the screw is bored and threaded as shown at 15 to receive an adjusting or take up screw 16, the head 6 being counterbored to receive the head of the screw 16 which lies flush with the outer face of the head 6 as shown in Fig. 4. The other end of the micrometer screw 9 is formed with a key socket 17 non-circular in cross section and designed to receive an ordinary key having an end portion corresponding in cross sectional shape with the socket 17, the micrometer screw 9 being adapted to be turned by said key for offsetting the cross head 8 in relation to the member 10. 18 designates a spline or key which is set into grooves of corresponding shape formed in the meeting faces of the members 6 and 10 and in order to hold the tool holding member tightly in engagement with the key or spline 18, we employ a take up screw 19 which is threaded through an opening in the side of the head 6 opposite the spline 18, the screw 19 having a tapered end which fits into a correspondingly shaped depression 20 in the member 10. By means of the screw 19 wear may be compensated for between the members 6 and 10 and all lost motion taken up. The member 10 is formed with a recess 21 to accurately receive and fit slidingly upon the internally threaded cross head 8 hereinabove described. Additional means for securing the member 10 in fixed relation to the head 6 is shown in Figs. 3 and 5 as consisting of threaded plugs or screws 22 inserted into threaded openings 23 formed partly in the member 10 and partly in the member 6, the outer ends of the screws being flush with the bottom face of the tool holder as a whole.

Adjacent to one end, the micrometer screw 9 is provided with a circumferential flange 24 and the head 6 is correspondingly counterbored or rabbeted to receive said flange 24. The outer face of the flange 24 forms a seat for a graduated ring 25 which surrounds the end portion of the micrometer screw and is fixedly secured thereto by fastening means 26 after the center of the tool holding member has been brought into the true center of the live spindle socket 11. The head 6 is dished as shown at 26' and provided with a single mark or graduation 27, suitable symbols 28 and 29 being provided on the dished surface 26 and on the dial or graduated ring 25 which register when the center of the tool is in true alinement with the center of the live spindle. When the micrometer screw 9 is turned by means of the usual key, it carries with it the graduated ring 25, thus enabling any desired adjustment to be obtained by means of the graduations on the dial ring and the head 6.

It will be observed that the several parts of the boring head as a whole are so assembled and related that said parts may be readily associated and disassociated by the ordinary mechanic without requiring the tool holder to be returned to the factory for adjustment.

We claim:—

1. In a boring tool holder, the combination of a head, a cross head carried thereby and having a sliding relation thereto, an annular bearing shoulder on said cross head working in contact with a face of said head, a cross head guide mounted in said head and having a concaved recess therein, an internally threaded extension of said cross head having an enlarged bearing portion working in the recess in the cross head guide, means for fastening the cross head guide in fixed relation to said head, and a micrometer screw extending through said internally threaded extension on the cross head and having its end portions journaled in opposite walls of said head.

2. In a boring tool holder, the combination of a head, a cross head carried thereby and having a sliding relation thereto, an annular bearing shoulder on said cross head working in contact with a face of said head, a cross head guide mounted in said head and having a concaved recess therein, an internally threaded extension of said cross head having an enlarged bearing portion working in the recess in the cross head guide, means for fastening the cross head guide in fixed relation to said head, a micrometer screw extending through said internally threaded extension on the cross head and having its end portion journaled in opposite walls of said head, the means for fastening the cross head guide in the head comprising a key engaging groove in the head and cross head guide members, a key in said groove, and a take up screw having a threaded engagement with the head and an abutting engagement with said cross head guide.

3. In a boring tool holder, the combination of a head, a cross head carried thereby and having a sliding relation thereto, an annular bearing shoulder on said cross head working in contact with a face of said head, a cross head guide mounted in said head and having a concaved recess therein, an internally threaded extension of said cross head having an enlarged bearing portion working in the recess in the cross head guide, means for fastening the cross head guide in fixed relation to said head, a micrometer screw extending through said internally threaded extension on the cross head and having its end portions journaled in opposite walls of said head, and an adjusting screw threaded into one end of the micrometer screw and having a head working in contact with an internal shoulder of said head.

In testimony whereof we affix our signatures.

JOHN H. FREY.
MATTHEW MAYER.